US010623911B1

(12) United States Patent
Delaney et al.

(10) Patent No.: US 10,623,911 B1
(45) Date of Patent: Apr. 14, 2020

(54) PREDICTIVE INTERMITTENT SERVICE NOTIFICATION FOR A MOBILE COMMUNICATION DEVICE

(71) Applicant: LENOVO (Singapore) PTE. LTD., New Tech Park (SG)

(72) Inventors: Mark Patrick Delaney, Raleigh, NC (US); John Carl Mese, Cary, NC (US); Nathan J. Peterson, Oxford, NC (US); Russell Speight VanBlon, Raleigh, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 0 days.

(21) Appl. No.: 16/368,720

(22) Filed: Mar. 28, 2019

(51) Int. Cl.
*H04W 24/00* (2009.01)
*H04W 4/029* (2018.01)
*H04W 68/00* (2009.01)
*H04W 4/02* (2018.01)

(52) U.S. Cl.
CPC ......... *H04W 4/029* (2018.02); *H04W 4/023* (2013.01); *H04W 68/005* (2013.01)

(58) Field of Classification Search
None
See application file for complete search history.

(56) References Cited

U.S. PATENT DOCUMENTS

| 6,721,572 | B1* | 4/2004 | Smith | H04W 4/029 455/456.1 |
| 8,509,852 | B2 | 8/2013 | Locker et al. | |
| 8,855,687 | B2 | 10/2014 | Locker et al. | |
| 2006/0094438 | A1* | 5/2006 | Hamilton | H04W 16/18 455/452.2 |
| 2009/0247147 | A1* | 10/2009 | Hadinata | H04W 4/16 455/421 |
| 2010/0120414 | A1* | 5/2010 | Bellovin | H04W 4/12 455/423 |
| 2014/0179279 | A1* | 6/2014 | Skeba | H04W 4/16 455/414.1 |
| 2015/0094054 | A1* | 4/2015 | Osman | H04M 1/72516 455/421 |
| 2016/0095000 | A1* | 3/2016 | Duan | H04W 16/18 |

\* cited by examiner

*Primary Examiner* — Erika A Washington
(74) *Attorney, Agent, or Firm* — Kunzler Bean & Adamson

(57) ABSTRACT

An apparatus for predictive intermittent service notification for a mobile communication device is disclosed. A method and computer program product also perform the functions of the apparatus. The apparatus includes a device locator that determines a location of a mobile communication device during a communication session with a remote communication device, a service zone mapper that estimates a travel time between the location of the mobile communication device and a current boundary of an intermittent service zone, and a notifier that communicates a predictive intermittent service notification in response to the estimated travel time falling within a predetermined range.

20 Claims, 8 Drawing Sheets

PREDICTIVE INTERMITTENT SERVICE NOTIFICATION FOR A MOBILE COMMUNICATION DEVICE

FIELD

The subject matter disclosed herein relates to mobile communication devices and more particularly relates to intermittent service prediction for a mobile communication device.

BACKGROUND

Widespread availability of services for mobile communication devices enables users of the mobile communication devices to engage in various communication sessions while traveling such as for example mobile telephone calls, conference calls, live streaming events, two-way radio communications, one-way radio communications, etc. Communication sessions over various types of communication services such as cellular phone service, two-way radio service, satellite phone service, large-area Wi-Fi services and so forth are sometimes degraded but not completely terminated. Some conventional communication devices detect current signal strength and display a current signal strength indicator on the display screen of the mobile device.

BRIEF SUMMARY

An apparatus for predictive intermittent service notification for a mobile communication device is disclosed. A method and computer program product also perform the functions of the apparatus. One apparatus for predictive intermittent service notification for a mobile communication device is disclosed that includes a device locator that determines a location of a mobile communication device during a communication session with a remote communication device, a service zone mapper that estimates a travel time between the location of the mobile communication device and a current boundary of an intermittent service zone, and a notifier that communicates a predictive intermittent service notification in response to the estimated travel time falling within a predetermined range.

A method for predictive intermittent service notification for a mobile communication device is disclosed that determine a location of a mobile communication device during a communication session with a remote communication device, estimate travel time between the location and a current boundary of an intermittent service zone, and communicating a predictive intermittent service notification in response to the estimated travel time falling within a predetermined range.

A program product is disclosed that includes a computer readable storage medium that stores code executable by a processor, the executable code comprising code to determine a location of a mobile communication device during a communication session with a remote communication device, estimate a travel time between the location and a current boundary of an intermittent service zone, and communicate a predictive intermittent service notification in response to the estimated travel time falling within a predetermined range.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
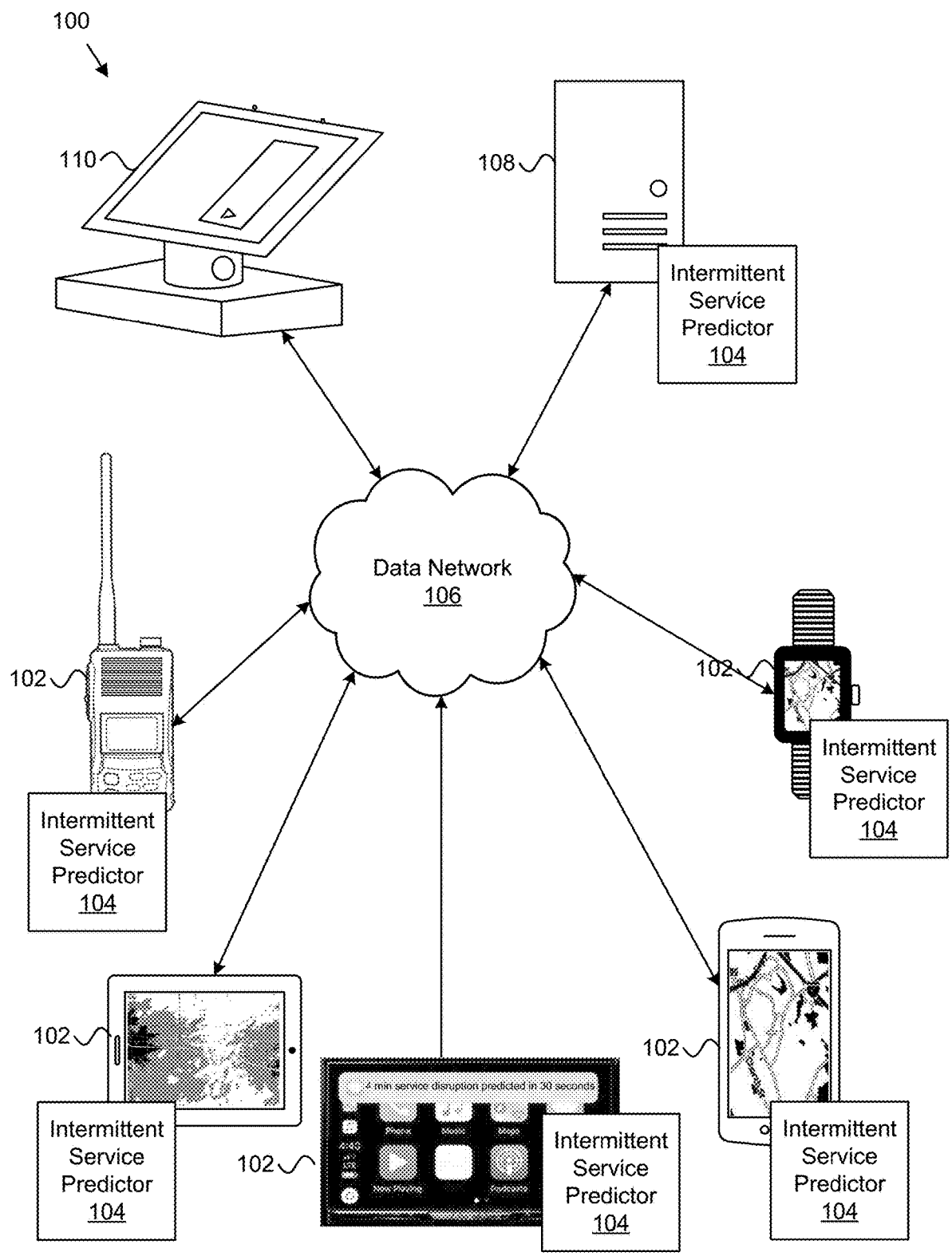
FIG. 1 is a schematic block diagram illustrating one embodiment of a system for intermittent service prediction for mobile communication devices.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," "component," "controller," "block," or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, components, controllers, and blocks in order to more particularly emphasize their implementation independence. For example, a module, component, controller, block, or system may be implemented as a hardware circuit comprising custom VLSI circuits or gate arrays, off-the-shelf semiconductors such as logic chips, transistors, or other discrete components. A module, component, controller, block, or system may also be implemented in programmable hardware devices such as field programmable gate arrays, programmable array logic, programmable logic devices or the like. Certain functional units described in the specification are specifically named and may be implemented using one or more modules, components, controllers, and blocks.

Modules, components, controllers, or blocks may also be implemented in code and/or software for execution by various types of processors. An identified module, controller, or block of code may, for instance, comprise one or more physical or logical blocks of executable code which may, for instance, be organized as an object, procedure, or function. Nevertheless, the executables of an identified module, controller, block, or system need not be physically located together, but may comprise disparate instructions stored in different locations which, when joined logically together, comprise the module and achieve the stated purpose for the module, component, controller, or block.

Indeed, a module, component, controller, or block of code may be a single instruction, or many instructions, and may even be distributed over several different code segments, among different programs, and across several memory devices. Similarly, operational data may be identified and illustrated herein within modules, components, controllers, or blocks, and may be embodied in any suitable form and organized within any suitable type of data structure. The operational data may be collected as a single data set, or may be distributed over different locations including over different computer readable storage devices. Where a module, component, controller, or block, or portions thereof are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, components, controllers, or blocks, user selections, network transactions, database queries, database structures, hardware modules, components, controllers, or blocks, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, component, controller, block, segment, or portion of code, which comprises one or more executable instructions of the code for implementing the specified logical function(s).

It should also be noted that, in some alternative implementations, the functions noted in the block diagram may occur out of the order noted in the Figures. For example, two blocks of a block diagram shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

In certain locations, at various times, and under particular conditions, images of the subject matter disclosed herein have determined that that cellular services and connections as well as other types of communication services used by a mobile communication device are spotty e.g., intermittent within a certain zone based on network coverage, user equipment, environmental conditions, and other external factors. Sometimes, a user of a communication device participating in a communication session such as a mobile phone call continues to talk on mobile phone only to be interrupted by a person on the other end saying something along the lines of "you are breaking up there, can you repeat that?"

The various embodiments disclosed herein of an intermittent service predictor for a mobile communication device significantly improve mobile communications by providing an intermittent service predictor, method, and computer program product that provide a predictive intermittent service notification to the user, thus avoiding the types of problems described above such as having to repeat communications or missing out on important portions of a communication session.

FIG. 1 depicts a schematic block diagram of one embodiment of a system 100 for intermittent service prediction for mobile communication devices. In one embodiment, the system 100 includes mobile communication devices 102, intermittent service predictors 104, data networks 106, servers 108, and remote communication devices 110. Even though a specific number of mobile communication devices 102, intermittent service predictors 104, data networks 106, servers 108 and remote communication devices 110 are depicted in FIG. 1, one of skill in the art will recognize that any number of mobile communication devices 102, intermittent service predictors 104, data networks 106, servers 108 and remote communication devices may be included in the system 100.

In one embodiment, the term "mobile communication device" refers to one or more devices such as cellular phones, tablet computers, laptop computers, personal digital assistants ("PDA"s), tablet computers, multifunction vehicle consoles, smart watches, radios, streaming devices, or the like. In some embodiments, the mobile communication device 102 access the data network 106 directly using a network connection. In certain embodiments, the mobile communication device 102 may be one or more wearable devices such as smart watches, optical head-mounted displays, or the like.

In certain embodiments, one or more of the mobile communication devices 102 includes an embodiment of the intermittent service predictor 104. In one embodiment, the intermittent service predictor 104 determines a location of the mobile communication device 102 during a communication session with a remote communication device, whether or not the remote communication device is mobile. In the embodiment, the intermittent service predictor 104 estimates a travel time between the location and a current boundary of an intermittent service zone and communicates a predictive intermittent service notification in response to the estimated travel time falling within a predetermined range. In this manner, the intermittent service predictor 104 is used for providing a predictive intermittent service notification for the mobile communication device 102. Further details regarding the structures and functions of various embodiments of the intermittent service predictor 104 are provided below with respect to FIGS. 2-6.

The data network 106, in one embodiment includes a digital communication network that transmits digital communications. In some embodiments, the data network 106 includes a wireless network such as a wireless cellular network, local wireless network, such as that Wi-Fi network, a Bluetooth® network a near field communication ("NFC") network, and ad hoc network, and/or the like. In certain embodiments, the data network 106 may include a wide area network ("WAN"), a storage area network ("SAN"), a local area network ("LAN"), an optical fiber network, the Internet, or other digital communication network. The data network 106 may in some embodiments, include one or more servers, routers, switches, and or other networking equipment. In certain embodiments, the data network 106 also includes computer readable storage media such as a hard disk drive, an optical drive, nonvolatile memory, RAM, or the like.

In one embodiment, the data network 106 includes two or more networks. In various embodiments, the data network 106 may include a radio network that transmits digital and/or analog signals. In certain embodiments, the data network 106 is a peer-to-peer network or an ad hoc network that may be formed between two or more radios, two or more cellular phones, and/or two or more vehicle communication devices. In some embodiments, the data network 106 includes satellite communications.

Figure 2:
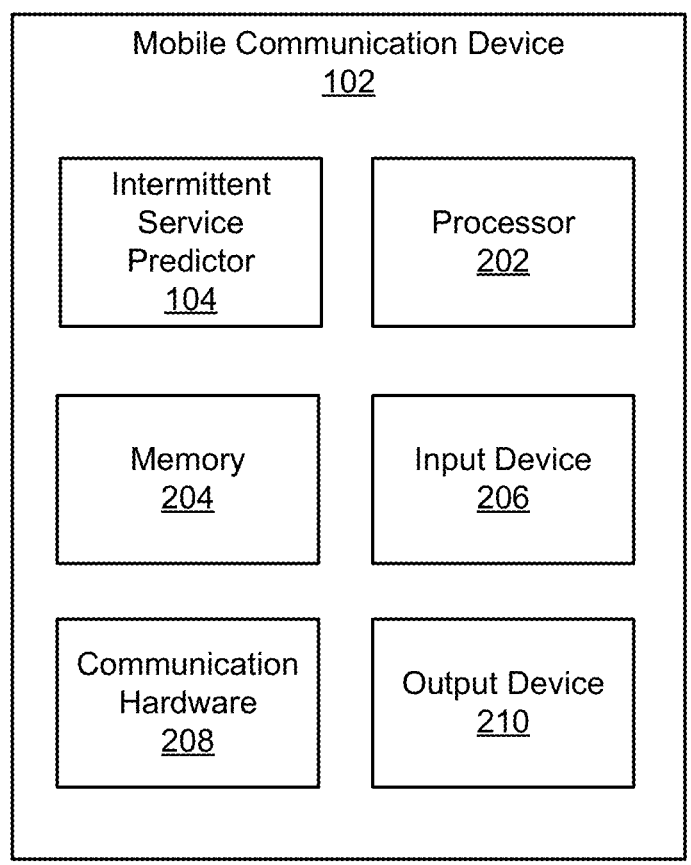
FIG. 2 is a schematic block diagram illustrating one embodiment of an apparatus with a mobile communication device including an intermittent service predictor.

FIG. 2 is a schematic block diagram illustrating one embodiment of an apparatus 200 that may be used for predictive intermittent service notification for a mobile communication device. The apparatus 200 includes one embodiment of the mobile communication device 102. Furthermore, the mobile communication device 102 in one embodiment includes the intermittent service predictor 104, a processor 202, a memory 204, and input device 206, communication hardware 208, and an output device 210. In some embodiments, the input device and the output device 210 are combined into a multifunction device such as a touch screen display with a camera and microphone that captures inputs e.g., touches, text, audio, images, and/or produces outputs such as images, text, audio, haptic outputs, etc.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the intermittent service predictor 104, the input device 206, the communication hardware 208, and the output device 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media.

In some embodiments, the memory 204 stores data relating to audio streams. In some embodiments, the memory 204 also stores program code and related data, such as an operating system or other controller algorithms operating on the audio handling device 102.

The mobile communication device 102 may use the intermittent service predictor 104 for predictive intermittent service notification for the mobile communication device 102. As may be appreciated, the intermittent service predictor 104 may include computer hardware, computer software, or a combination of both computer hardware and computer software. For example, the intermittent service predictor 104 may include circuitry, or a processor, used to perform, by use of the processor 202, determining a location of a mobile communication device during a communication session with a remote communication device. As another example, the intermittent service predictor 104 may include computer program code that estimates a travel time between the location and a current boundary of an intermittent service zone. As a further example, the intermittent service predictor 104 may include computer program code that communicate a predictive intermittent service notification in response to the estimated travel time falling within a predetermined range.

The input device 206, in various embodiment, includes one or more microphones that capture sound such as speech, audio played back the output device 210 or by different device configured to output audio such as, for example, a computer, tablet, cell phone, speaker phone, intercom, sound system, audio player, video player, radio, television, smart appliance, and the like, may include any known computer input device including a touch panel, a button, a keyboard, a stylus, or the like. In some embodiments, the input device 206 may be integrated with the output device 210, for example, as a touchscreen or similar touch-sensitive display.

In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

In various embodiments, the communication hardware 208 facilitates communication with other devices. For example, the communication hardware 208 may enable communication via Bluetooth®, Wi-Fi, and so forth. In some embodiments, the communication includes bidirectional communication session of voice data over a network connection such as for example, VOIP streams, VOIP sessions, broadcasts, etc. In certain embodiments, the terms "VOIP," "VOIP stream," or "VOIP session" are used to refer to communication over various types of network technologies (e.g., managed networks, cellular networks, networks, radio networks, and so forth) for communicating audio data (e.g., sounds, voices, etc.) and is not limited to communications over the public Internet or networks that use packets or internet protocol.

In one embodiment, the output device 210 includes one or more speakers for producing sound. For example, in various embodiments the output device 210 plays audio from streaming communications sessions from various applications such as teleconferencing applications, online education applications, social media applications, audio and video media applications, recording applications, smart assistant applications, and so forth.

In various embodiments, the output device 210 further includes an electronically controllable display or display device. The output device 210 in certain embodiments is designed to output visual, audible, and/or haptic signals. In some embodiments, the output device 210 includes an electronic display capable of outputting visual data to a user. For example, in various embodiments, the output device 210 includes one or more display devices such as an LCD display, an LED display, an OLED display, a projector, or similar output device capable of outputting sounds, images, text, or the like to a user. As another, non-limiting, example, the output device 210 in some embodiments includes a wearable display such as a smart watch, smart glasses, a heads-up display, or the like. Further, the output device 210, in some embodiments, is a component of a smart phone, a personal digital assistant, a notebook (laptop) computer, a tablet computer, a vehicle computer, a streaming device, radio, or the like.

In some embodiments, all or portions of the output device 210 may be integrated with the input device 206. For example, the input device 206 and output device 210 may form a touchscreen or similar touch-sensitive display. In other embodiments, the output device 210 may be located near the input device 206. In certain embodiments, the output device 210 may receive instructions and/or data for output from the processor 202 and/or the intermittent service predictor 104.

Figure 3:
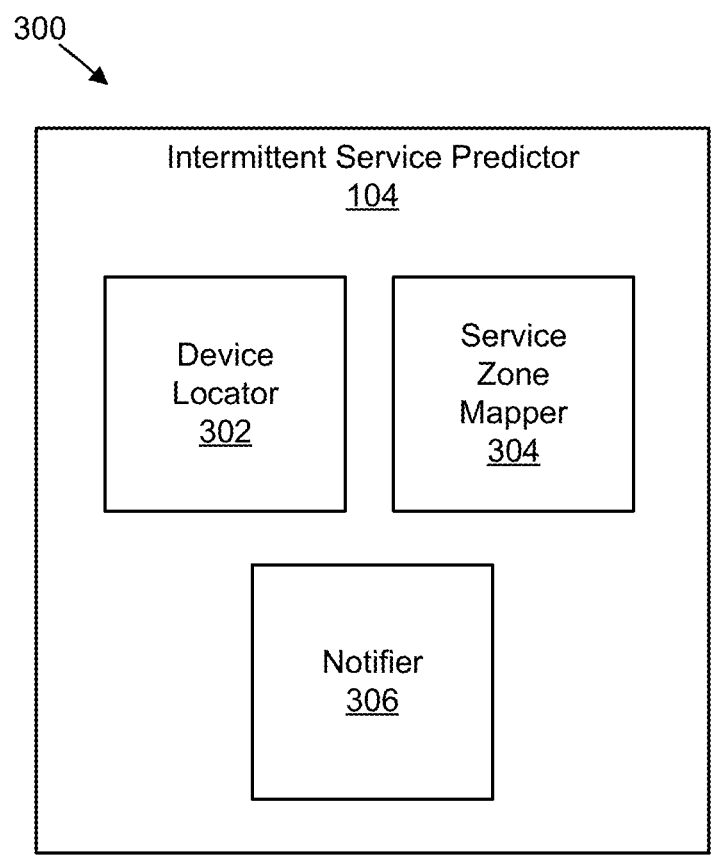
FIG. 3 is a schematic block diagram illustrating one embodiment of an apparatus including an intermittent service predictor for providing predictive intermittent service notification.

FIG. 3 depicts a schematic block diagram illustrating one embodiment of an apparatus 300 that includes one embodiment of the intermittent service predictor 104 for predictive intermittent service notification for a mobile communication device. The intermittent service predictor 104 includes a device locator 302, a service zone mapper 304, and a notifier 306.

The intermittent service predictor 104, in one embodiment, determines a location of a mobile communication device during a communication session with a remote communication device. In the embodiment, the intermittent service predictor 104 estimates a travel time between the location and a current boundary of an intermittent service zone; and communicates a predictive intermittent service notification in response to the estimated travel time falling within a predetermined range.

In one embodiment, one or more of the device locator 302, the service zone mapper 304, and the notifier 306 are modules or components in which at least a portion of the device locator 302, the service zone mapper 304, and/or notifier 306 module or component is implemented as program code executable by the processor 202 of the mobile communication device 102. For example, in some embodiments, a portion of the device locator 302, the service zone mapper 304, and the notifier 306, module or component is implemented in firmware of the mobile communication device 102. In other embodiments, a portion of the relevant module or component is implemented in program code downloadable as an app from an app vendor or a service provider. In such embodiments, the app may communicate via inter-process communications ("IPC"), web services, and/or a web application programming interface ("API").

In one embodiment, one or more of the one or more of the device locator 302, the service zone mapper 304, and the notifier 306 perform algorithms that include one or more steps of the method 700 and/or the method 800 described below with respect to FIG. 7 and FIG. 8.

The device locator 302 in one embodiment, is a module or component which determines the location of a mobile communication device during the communication session with a remote communication device. In various embodiments, at least a portion of the device locator 302 module or component is implemented as program code executable by the processor 202 of the mobile communication device 102. For example, in some embodiments, a portion of the device locator 302 module or component is implemented in firmware of the mobile communication device 102. In other embodiments, a portion of the device locator 302 module or component is implemented in program code downloadable as an app from an app vendor or a service provider. In some embodiments, at least a portion of the device locator 302 module or component may be implemented as program code executable by a processor on one or more servers 108, web services, or web application programming interface ("API") which are in communication with the mobile communication device 102 over the data network 106.

In some embodiments, the device locator 302 module or component includes one or more hardware components such as a GPS receiver, a radio transceiver, programmable logic, mixed-signal circuitry, and so forth. In some embodiments, the device locator 302 module or component uses that one or more hardware components in connection with device location algorithms. For example, in one embodiment, a cellular radio transceiver of the device locator 302 module or component communicates with one or more cellular base stations to collect data for determining the location of the mobile device using a triangulation algorithm.

In some embodiments, the device locator 302 module or component determines travel parameters for the mobile communication device 102. For example, in certain embodiments, the device locator 302 module or component determines an estimated travel speed of the mobile communication device, a forward travel direction of the mobile communication device using an internal sensor such as a step counter, an accelerometer, and the like or using an interface to another device such as for example a vehicle speedometer, compass, onboard computer, etc. In various embodiments, the device locator 302 module or component uses the internal sensor or the interface to obtain data for calculating a travel direction, a travel speed, or similar parameters. In other embodiments, the device locator 302 module or component determines travel parameters by communicating with external services such as an online geolocation API.

In various embodiments, the device locator 302 determines other parameters such as a predetermined travel route stored in a computer readable storage medium of the mobile communication device and/or stored online retrieved for the mobile communication device. In one embodiment, the travel parameters include traffic conditions for predetermined distance in the forward travel direction of the mobile communication device.

The service zone mapper 304, in one embodiment, estimates a travel time between the location of the mobile communication device and a current boundary of an intermittent service zone. In certain embodiments, the service zone mapper 304 determines the current boundary for the intermittent service zone based on service data comprising one or more of location data, signal strength data, communication interruption data, and user input data, stored by at least one of the mobile communication device and another communication device during a communication session, e.g., one or more prior communication sessions.

In various embodiments, the service zone mapper 304 module or component uploads service data and/or travel parameters to an online service or database to be aggregated with service data and/or travel parameters from other mobile communication devices. By aggregating the service data and/or the travel parameters from multiple mobile communication devices, the service zone mapper 304 module or component improves the predictive intermittent service zone system by averaging, aggregating, or otherwise processing sufficient samples of service data and or travel parameters to be able to statistically filter out outlying data and/or anomalous data from a malfunctioning component in the mobile communication device or mistakenly entered as user input.

In certain embodiments, the current boundary for the intermittent service zone changes dynamically based upon environmental conditions such as snow, rain, lightning, temperature, solar radiation, and so forth which affect propagation of electromagnetic waves transmitted or received between the service provider and the mobile communication device. In other embodiments, the current boundary for the intermittent service zone changes dynamically based on user input and/or service data obtained from multiple mobile communication devices.

In one embodiment, the service zone mapper 304 determines the current boundary for the intermittent service on based at least in part an electronically accessible coverage map associated with a service provider for the mobile communication device. By using an electronically accessible coverage map associated with a particular service provider that provides service for the mobile communication device, the service zone mapper 304 is configurable to account for differences in coverage between different service providers. In various embodiments, the service zone mapper displays a map of the location of the mobile communication device and the current boundary of the intermittent service zone.

In some embodiments, the service zone mapper 304 adjusts the current boundary of the intermediate service on in response to user input provided using one or more of a graphical user interface and a hands-free interface. For example, a user who is traveling in a vehicle may encounter intermittent service conditions in an area not yet included in the current boundary of the intermediate service zone. In response, a user such as a passenger in the vehicle may touch or otherwise select a location on the graphical user interface of the mobile communication device so as to identify the location where the intermittent service conditions were encountered. As another example, a user such as a driver in the vehicle may give a voice command to add the location where the intermittent service conditions were encountered to an internal or external database used to determine the boundary of the intermediate service zone.

The service zone mapper 304 in some embodiments, uses moving averages, maximums and minimums, standard deviations, and other algorithms to combine current and/or historical service data, and/or travel parameters which in turn are used to determine the current boundary and/or a future boundary of the intermittent service zone.

The notifier 306, in one embodiment, communicates a predictive intermittent service notification in response to the estimated travel time falling within a predetermined range. In various embodiments, the predetermined range is input by a user and stored in a computer readable storage medium of the mobile communication device or of another computer readable storage device that is accessible over the data network 106.

For example, a user who prefers to be predictively notified of an upcoming intermittent service zone with ample time to conclude a communication session with a remote user prior to entering the intermittent service zone sets the notifier 306 to communicate the predictive intermittent service notification in response to the estimated travel time falling within five minutes. In other words, when the services zone mapper 304 estimates a travel time of greater than five minutes, the notifier 306 communicating the predictive intermittent service notification until the estimated travel time falls within the predetermined five minute range.

In one embodiment, the notifier 306 communicates the predictive intermittent service notification to the mobile communication device and to the remote communication device. In this manner, the users of both the mobile communication device and remote communication device are notified of the risk of the communication session being interrupted. In various embodiments, the predictive intermittent service notification includes one or more of an audible signal, a haptic signal, a textual notification, and a visual signal. For example, one type of audible signal is a short tone such as a beep or a programmable tone. Another type of audible signal is a voice recording, or a computer generated voice. As used herein, the term "haptic signal" refers to a signal such as a vibration, buzzing, or any signal that may be felt by a user. In some embodiments, using haptic signals improves the intermittent service notification technology by allowing the predictive intermittent service notification to be communicated silently.

In certain embodiments, this textual notification is a short text message, a pop-up notification, an email, or similar type of message. In various embodiments, the visual signal is a color change, a flash, an icon, or any visual signal that is displayed in a portion of a display screen of the mobile communication device.

In some embodiments, one type of predictive intermittent service notification may be communicated to the mobile communication device and a different type of predictive intermittent service notification may be communicated to the remote device. For example, in one embodiment, certain traveling employees of a company such as salespersons call into a meeting of the sales team while traveling and have travel routes that take them through intermittent service zones. The predictive intermittent service notification communicated to the mobile communication device used by the traveling salesperson is an audible signal and the intermittent service notification communicated to the remote communication device e.g. the device used by a person controlling the conference call is communicated by a silent notification such as a haptic signal, a visual signal, or textual signal.

Because the notifier 306 in the above example uses a silent notification to the remote communication device e.g. the conference service system, the rest of the persons attending the conference call in-person or remotely are less likely to be disturbed by an audible predictive intermittent service notification. At the same time, the silent predictive intermitted service notification improves conference calling technology, for example by allowing the moderator or person running the meeting to be made aware that the traveling salesperson is entering and intermittent service zone within a particular amount of time and will be unavailable to hear or respond to topics raised in the meeting.

Figure 4:
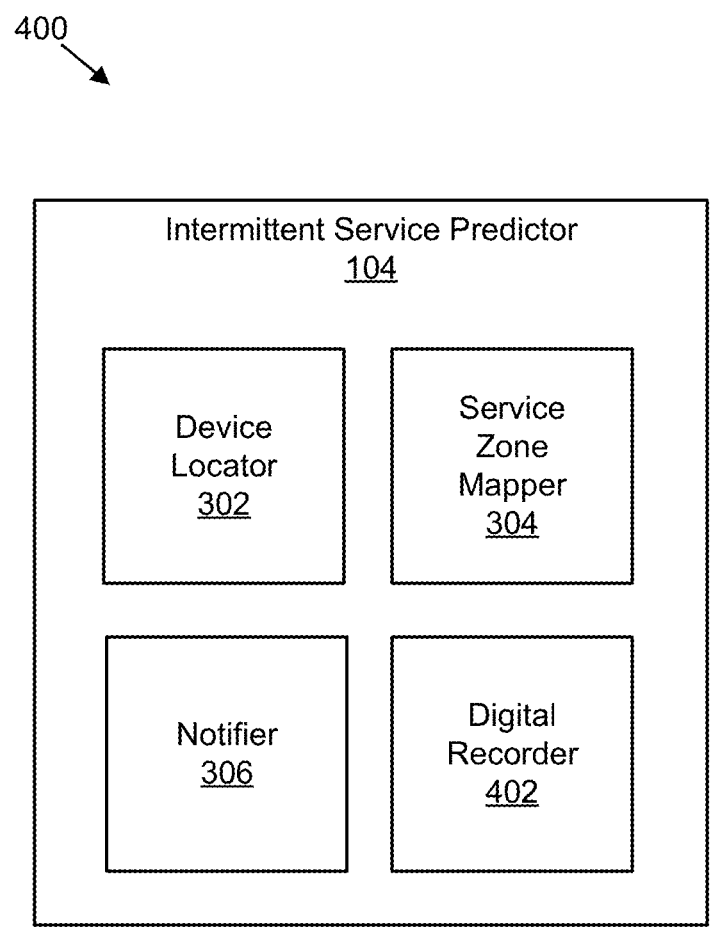
FIG. 4 is a schematic block diagram illustrating another embodiment of an apparatus including an intermittent service predictor for providing predictive intermittent service notification.

FIG. 4 is a schematic block diagram illustrating another embodiment of an apparatus 400 including an intermittent service predictor 104 for predictive intermittent service notification for a mobile communication device 102. The intermittent service predictor 104 includes one embodiment of the device locator 302, the service zone mapper 304, and the notifier 306, that may be substantially similar to the device locator 302, the service zone mapper 304, and the notifier 306 described in relation to apparatus 300 depicted in FIG. 3.

In one embodiment, the estimated travel time which is computed by the service zone mapper 304 is a zone entrance time, meaning the estimated travel time from the current location of the communication device 102 to enter the boundary of the intermittent service zone. In another embodiment, the estimated travel time computed by the service zone mapper 304 is a zone exit time meaning the estimate travel time from a current location of the communication device 102 exit the boundary of the intermittent service zone. In certain embodiments, the service zone mapper 304 performs an algorithm to compute a predicted travel duration of the mobile communication device 102 within the intermittent service zone, such as subtracting the zone entrance time from the zone exist time. In various embodiments, the notifier 306 communicates the predicted zone entrance time and the predicted travel duration within the intermittent service zone.

In one embodiment, the apparatus 400 further includes a recorder 402 for recording and/or playing back a recording of a portion of the communication session. In certain embodiments, the recorder 402 records a portion of the communication session in response to the zone entrance time falling within the predetermined range. In one example, in response to the zone entrance time falling within a predetermined range of 30 seconds, the recorder begins recording a portion of the communication session so that upon exiting the intermittent service zone, the recorded portion may be played back either so that the persons who are speaking at the time the recording began can hear where they left off or so that the person who misses part of a communication session due to a disruption within the intermittent service zone can hear what was said during the disruption.

Accordingly, in some embodiments, the recorder 402 plays back the portion of the communication session in response to the zone exit time falling within the predetermined range. It may be noted that the predetermined range for the zone exit time is configurable to include both positive and negative numbers so that the recorder for all to waits until the mobile communication device has exited the intermittent service zone before playing back the recorded portion. In some embodiments, the recorder 402 saves the recorded portion to a storage device so that it can be played back later, for example, in response to user input requesting the recorded portion to be played back.

Figure 5:
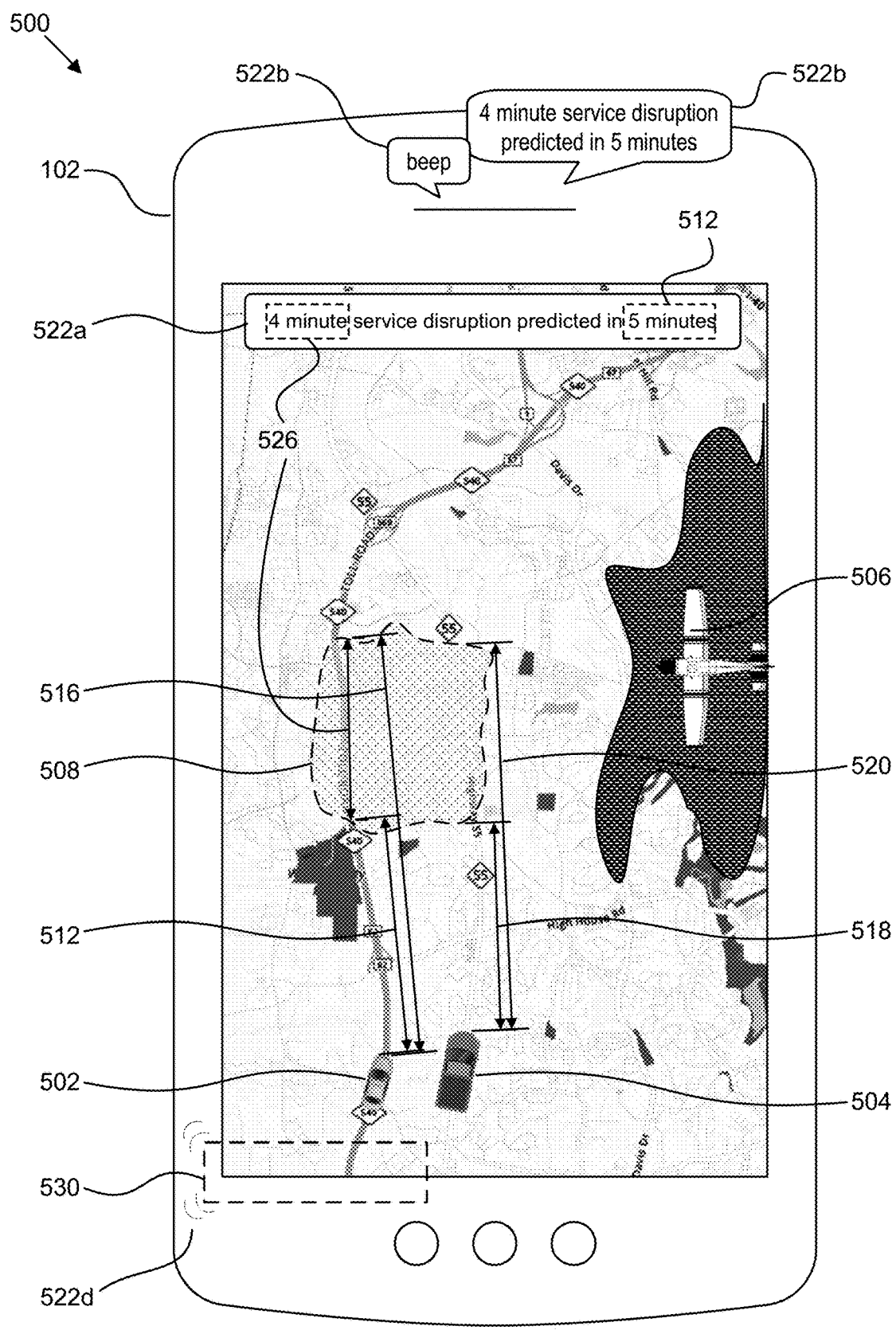
FIG. 5 is a schematic block diagram illustrating one embodiment of an apparatus including a mobile communication device for performing predictive intermittent service notification.

FIG. 5 is a schematic block diagram illustrating one embodiment of a system 500 for performing predictive intermittent service notification. In certain embodiments, the system 500 includes a mobile communication device 102 with one or more processors, computer readable storage media, and code executable by the one or more processors as well as various output devices such as a touchscreen display 532, a speaker 534, a microphone 536, a haptic output device 530, and/or other modules, components, networks, or systems described above with respect FIGS. 1, 2, 3, and/or 4 or typically found in mobile communication devices.

Although FIG. 5 depicts a first mobile communication device 502 as an icon of a car, a second mobile communication device 504 as an icon of the truck, and a third mobile communication device 506 as an icon of an airplane, such depictions are merely exemplary and some mobile communication devices 102 are usable in other kinds of vehicles such as boats, bicycles, etc., and are also usable outside of vehicles by pedestrians, hikers, and so forth who seek the benefits of predictive intermittent service zone notification as disclosed herein.

In the depicted embodiment, the system 500 determines the location of the first mobile communication device 502 (the "car") during a communication session with a remote communication device (the "remote participant"). The system 500 estimates a first estimated travel time 512 (e.g., a zone entrance time) between the location of the mobile communication device and a current boundary of an intermittent service zone 508. The system 500 determines the current boundary of the intermittent service zone 508, for example using the apparatus 300 or apparatus 400 described above with respect to FIGS. 3 and 4. The first estimated travel time 512 is represented by a line between the location of the car and the boundary of the intermittent service zone 508 that the car is predicted to enter because distance is one of several travel parameter the system 500 uses to determine the travel time.

Other travel parameters used in various embodiments may include travel speed of the mobile communication device, a projected travel route, traffic conditions and speed limits for the route, as so forth. For example, in the depicted example, the second mobile communication device 504 (the "truck") is traveling at a lower speed along a different route that may require stops. Thus, the system would determine the estimate zone entrance and exit times 518, 520 for the truck on the slow route to be less than the zone entrance and exit times for the car and greater than, for example, the zone entrance and exit times for the plane 506.

The system 500 also estimates a second estimated travel time 516 (e.g., a zone exit time) between the location of the mobile communication device and a current boundary of an intermittent service zone 508. The second estimated travel time 516 is represented by a line between the location of the car and the boundary of the intermittent service zone 508 that the car is predicted to exit. The system 500, in some embodiments, calculates a predicted duration 526 that the car will be in the intermittent service zone (e.g., based on the difference between the second estimated travel time 516 and the first estimated travel time 512.

In various embodiments, the system 500 communicates one or more predictive intermittent service notifications e.g., 522a (visual, text), 522b (audio), 522c (speech), and/or 522d (haptic) in response to determining that the estimated travel time (e.g., the zone entrance time of five minutes) falls within a predetermined range. In some embodiments, the system 500 communicates any one or combination of the predictive intermittent service notifications to the mobile communication device 102 and/or to one or more remote communication devices.

In certain embodiments, the system 500 performs one or more of its functions using one or more of the device locator 302, the service zone mapper 304, the notifier 306, and the recorder 402. By providing predictive intermittent service notifications, the system 500 improves mobile communications technology by providing multiple options to solve the problems in existing systems of unawareness of intermittent service by a user of the mobile communication device e.g., notifying, arranging to call back, recording and playing back, and so forth.

Figure 6:
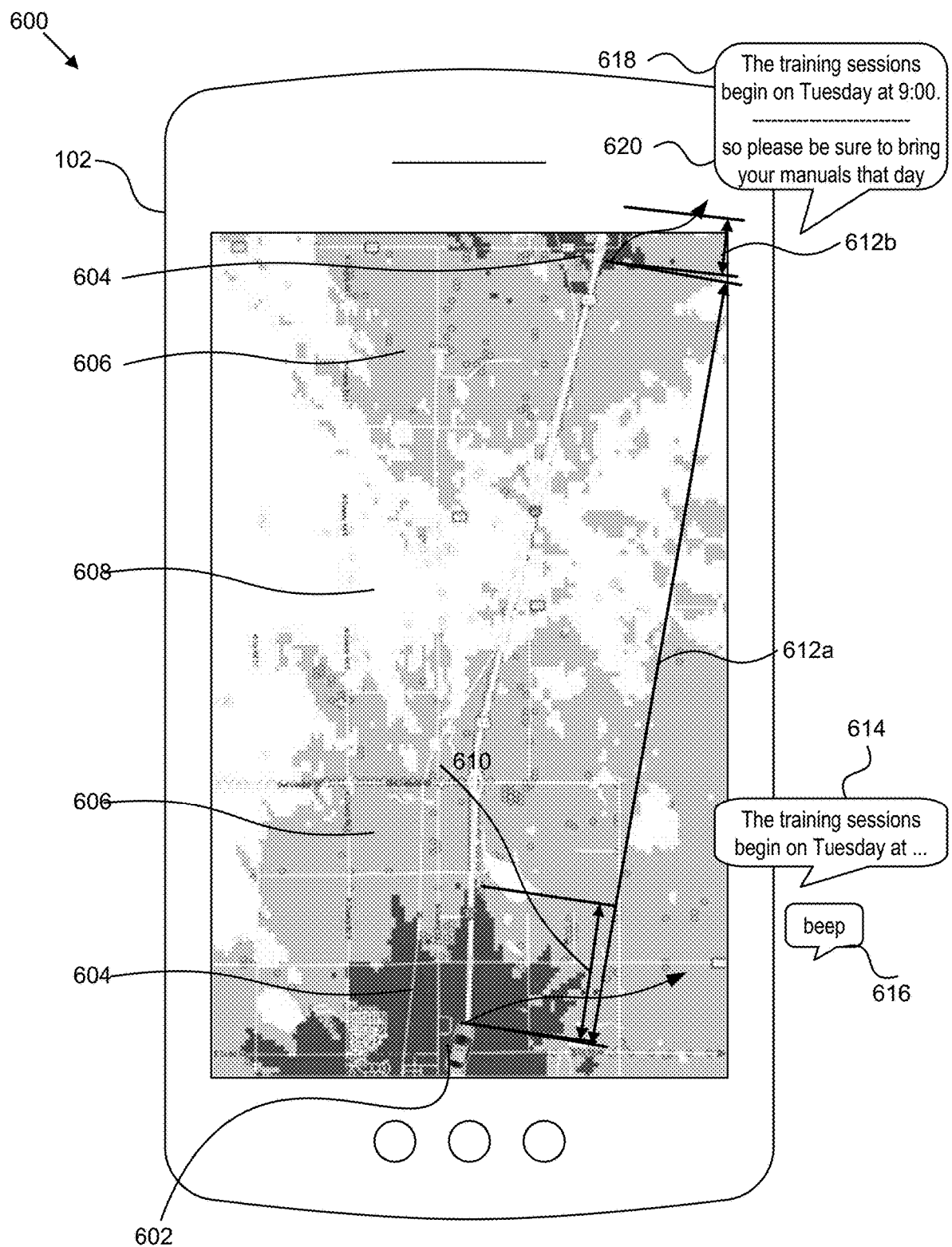
FIG. 6 is a schematic block diagram illustrating another embodiment of an apparatus including a mobile communication device for performing predictive intermittent service notification.

FIG. 6 is a schematic flow chart diagram illustrating one embodiment of a system 600 for predictive intermittent service notification for a mobile communication device. In certain embodiments, the elements of the system 600 are substantially similar to the system 500 described above with respect to FIG. 5. In one embodiment, the system 600 determines a location of a mobile communication device 102 during a communication session with a remote communication device. The system 600 further estimates a travel time e.g., 610, 612a, and/or 612b, between the location of the mobile communication device and a current boundary of an intermittent service zone.

In some embodiments, the system 600 determines the current boundary of the intermittent service zone based at least in part on an electronically accessible coverage map associated with a service provider for the mobile communication device. For example, the mobile communication device 102 is depicted as displaying an electronically accessible coverage map associated with a service provider. The map includes an "excellent" coverage zone 604 (dark shading), an "good" coverage zone 606 (medium shading), and a "fair" coverage zone 608 (no shading) for the service provider.

In one embodiment, in response to the system 600 determining that the first estimated travel time 610 (e.g., zone entrance time) falls within a predetermined range, the system 600 communicates a predictive intermittent service notification 616 and begins recording a portion 614 of the communication session. In some embodiments, the system 600 further plays back the recorded portion 618 and/or another recorded portion 620 of the communication session in response to determining that a second estimated travel time e.g., 612b falls within a predetermined range. Thus, the system 600 solves problems of existing systems in which portions of the communication session, or participation in the communication session are missed due a user of the mobile communication device 102 or of a remote communication device not having a predictive intermittent service notification. In various embodiments, the system 600 performs one or more of its functions using one or more of the device locator 302, the service zone mapper 304, the notifier 306, and the recorder 402.

Figure 7:
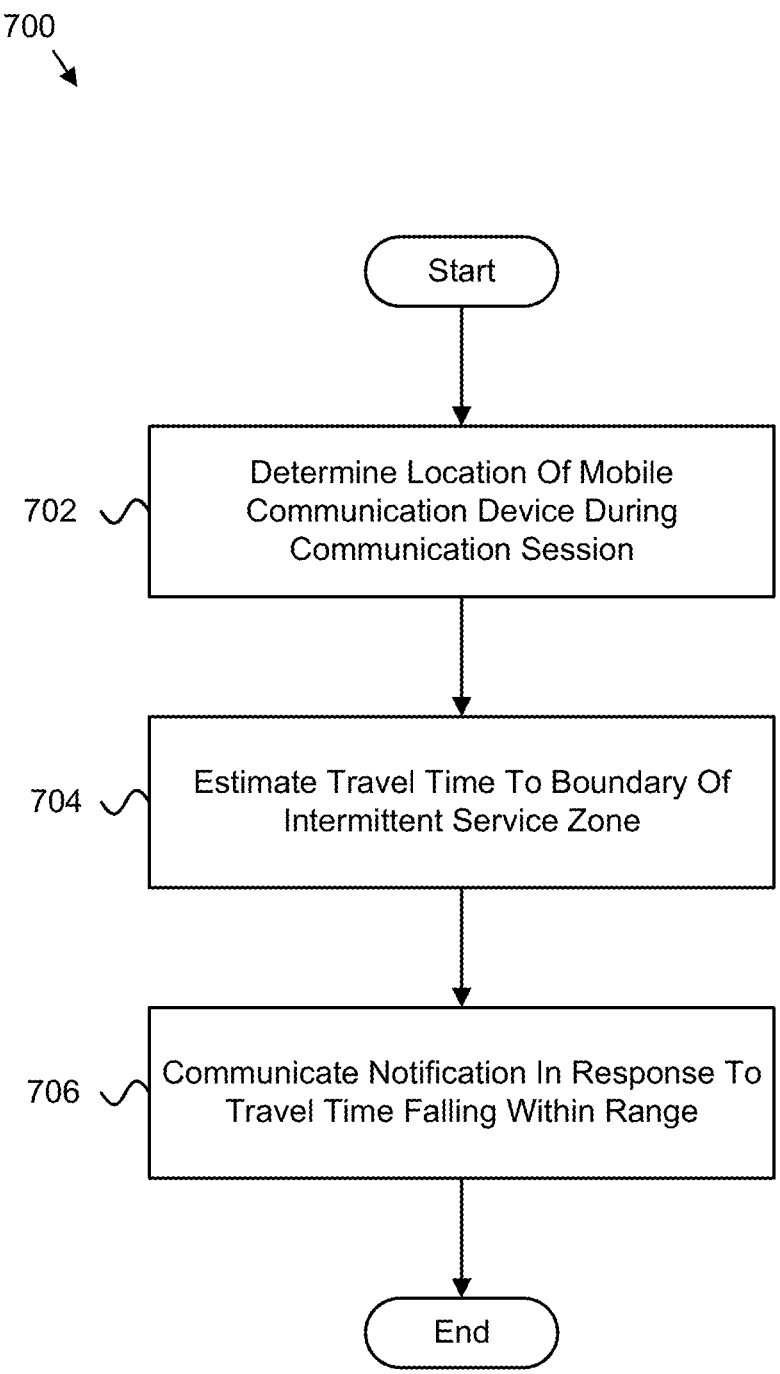
FIG. 7 is a schematic flow chart diagram illustrating one embodiment of a method for predictive intermittent service notification.

FIG. 7 is a schematic flow chart diagram illustrating an embodiment of a method 700 for predictive intermittent service notification for a mobile communication device. In one embodiment, the method 700 begins and determines 702 a location of a mobile communication device during a communication session with a remote communication device. The method 700 continues and estimates 704 a travel time between the location and a current boundary of an intermittent service zone and communicates 706 a predictive intermittent service notification in response to the estimated travel time falling within a predetermined range. In certain embodiments, the device locator 302, the service zone mapper 304, the notifier 306 and/or the recorder 402 perform one or more of the steps of the method 700.

Figure 8:
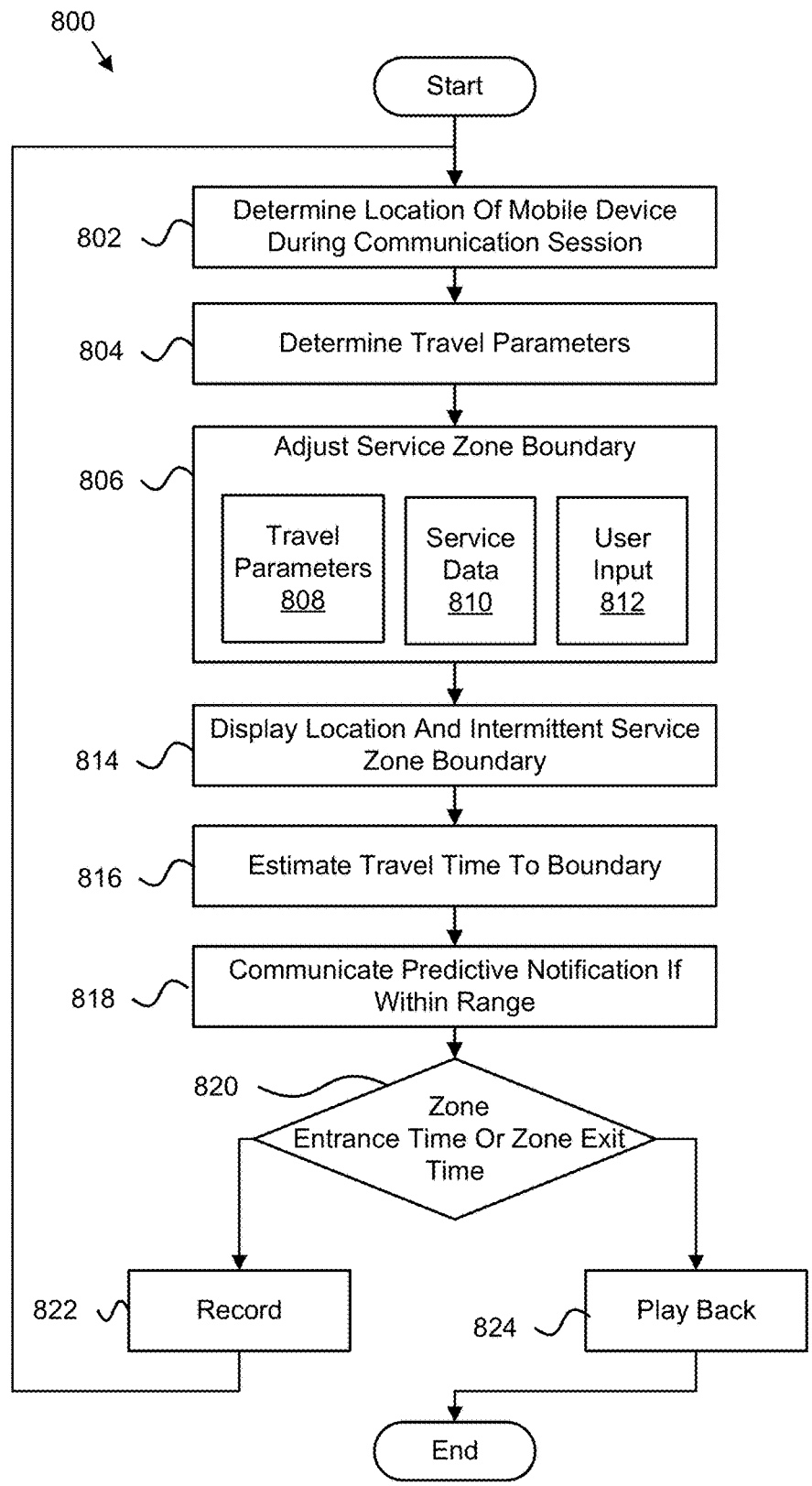
FIG. 8 is a schematic flow chart diagram illustrating another embodiment of a predictive intermittent service notification method.

FIG. 8 is a schematic flow chart diagram illustrating another embodiment of a method 800 for predictive intermittent service notification for a mobile communication device. In one embodiment, the method 800 begins and determines 802 a location of a mobile communication device during a communication session with a remote communication device. In some embodiments, the method 800 continues and determines 804 travel parameters 808 for the mobile communication device, such as by way of non-limiting examples, an estimated travel speed of the mobile communication device, a travel direction of the mobile communication device, a predetermined travel route stored in a computer readable storage medium of the mobile communication device, environmental conditions, and traffic conditions for a predetermined distance in the travel direction.

In certain embodiments, the method 800 continues and adjusts 806 the current boundary of the intermittent service zone based at least in part on the travel parameters 808, service data 810, and/or user input 812, for the mobile communication device and/or for one or more different mobile communication devices.

In various embodiments, the method 800 continues and estimates 816 a travel time between the location of the mobile communication device and the current boundary of the intermittent time zone. In some embodiments, in response to the travel time falling within a predetermined range, the method 800 records 822 a portion of the communication session if the travel time is a zone entrance time and plays back 824 the recorded portion and another portion if the travel time is a zone exit time (e.g., indicating that the mobile communication device has exited the intermittent service zone). In certain embodiments, the device locator 302, the service zone mapper 304, the notifier 306 and/or the recorder 402 perform one or more of the steps of the method 800.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a device locator that determines a location of a mobile communication device during an online conference communication session with a remote communication device configured to be used by a moderator and at least one other remote communication device;
a service zone mapper that estimates a travel time between the location of the mobile communication device and a current boundary of an intermittent service zone;
a notifier that in response to the estimated travel time falling within a predetermined range: communicates to the remote communication device configured to be used by the moderator, a predictive intermittent service notification indicating estimated times in which the mobile communication device within the current boundary of the intermittent service zone will be unavailable, without interrupting the online conference communication session between the remote communication device configured to be used by the moderator and the at least one other remote communication device.

2. The apparatus of claim 1, wherein
the device locator determines travel parameters for the mobile communication device; and
the service zone mapper estimates the travel time based at least in part of the travel parameters.

3. The apparatus of claim 2, wherein the travel parameters comprise one or more of an estimated travel speed of the mobile communication device, a travel direction of the mobile communication device, a predetermined travel route stored in a computer readable storage medium of the mobile communication device, environmental conditions, and traffic conditions for a predetermined distance in the travel direction.

4. The apparatus of claim 1, wherein the service zone mapper performs one or more of adjusting the current boundary of the intermittent service zone and estimating a travel time between the location of the mobile communication device and the current boundary of the intermittent service zone based at least in part on travel parameters and service data for the mobile communication device and one or more different mobile communication devices.

5. The apparatus of claim 1, wherein the service zone mapper determines the current boundary for the intermittent service zone based on service data comprising one or more of location data, signal strength data, communication interruption data, and user input data, stored by at least one of the mobile communication device and another communication device during a communication session.

6. The apparatus of claim 1, wherein the service zone mapper determines the current boundary for the intermittent service zone based at least in part on an electronically accessible coverage map associated with a service provider for the mobile communication device.

7. The apparatus of claim 1, wherein the service zone mapper displays a map of the location and the current boundary of the intermittent service zone.

8. The apparatus of claim 7, wherein the service zone mapper adjusts the current boundary of the intermittent service zone in response to user input provided using one or more of a graphical user interface and a hands-free interface.

9. The apparatus of claim 1, wherein the notifier communicates the predictive intermittent service notification to the mobile communication device and to the remote communication device.

10. The apparatus of claim 1, wherein the predictive intermittent service notification comprises one or more of an audible signal, a haptic signal, a textual notification, and a visual signal.

11. The apparatus of claim 10, further comprising a recorder that records a portion of the online conference communication session between the remote communication device configured to be used by a moderator and the at least one other remote communication device in response to the zone entrance time falling within the predetermined range.

12. The apparatus of claim 11, wherein the recorder plays back to the mobile communication device the recorded portion of the conference communication session in response to the zone exit time falling within the predetermined range.

13. The apparatus of claim 1, wherein the estimated travel time between the location and the current boundary of the intermittent service zone comprises one or more of a zone entrance time associated with a first notification and a zone exit time associated with a second notification.

14. A method comprising:
    determining a location of a mobile communication device during an online conference communication session with a remote communication device configured to be used by a moderator and at least one other remote communication device;
    estimating a travel time between the location and a current boundary of an intermittent service zone;
    in response to the estimated travel time falling within a predetermined range for a zone entrance time, recording at least a portion of the online conference communication session between the remote communication device configured to be used by the moderator and the at least one other remote communication device; and
    in response to the estimated travel time falling within a predetermined range for a zone exit time indicating that the mobile communication device has exited the intermitted service zone, playing back to the mobile communication device, the recorded portion of the online conference communication session between the remote communication device configured to be used by the moderator and the at least one other remote communication device.

15. The method of claim 14, wherein determining the current boundary for the intermittent service zone is based on service data comprising one or more of location data, signal strength data, communication interruption data, and user input data, stored by at least one of the mobile communication device and another communication device during a prior communication session.

16. The method of claim 15, further comprising:
    determining travel parameters for the mobile communication device; and
    estimating the travel time based at least in part on the travel parameters.

17. The method of claim 16, further comprising adjusting the current boundary of the intermittent service zone based at least in part on the travel parameters and the service data for the mobile communication device and for one or more different mobile communication devices.

18. The method of claim 14, further comprising adjusting the current boundary of the intermittent service zone in response to user input provided using one or more of a graphical user interface and a hands-free interface.

19. The method of claim 14, wherein the estimated travel time between the location and the current boundary of the intermittent service zone comprises one or more of a zone entrance time associated with a first notification and a zone exit time associated with a second notification.

20. A program product comprising a computer readable storage medium that stores code executable by a processor, the executable code comprising code to:
    determine a location of a mobile communication device during an online conference communication session with a remote communication device configured to be used by a moderator and at least one other remote communication device;
    estimate a travel time between the location and a current boundary of an intermittent service zone; and
    in response to the estimated travel time falling within a predetermined range, communicates to the remote communication device configured to be used by the moderator, a predictive intermittent service notification indicating estimated times in which the mobile communication device within the current boundary of the intermittent service zone will be unavailable without interrupting the online conference communication session between the remote communication device configured to be used by the moderator and the at least one other remote communication device.

\* \* \* \* \*